(12) United States Patent
Lichtenberger

(10) Patent No.: US 6,837,236 B1
(45) Date of Patent: Jan. 4, 2005

(54) SOLAR ENERGY CONVERSION SYSTEM

(76) Inventor: Michael Lichtenberger, 5779 Bertrand Ave., Encino, CA (US) 91316

(*) Notice: Subject to any disclaimer, the term of this patent is extended or adjusted under 35 U.S.C. 154(b) by 0 days.

(21) Appl. No.: 10/640,552

(22) Filed: Aug. 13, 2003

Related U.S. Application Data

(60) Provisional application No. 60/404,550, filed on Aug. 21, 2002.

(51) Int. Cl.[7] .................................................. F24J 2/04
(52) U.S. Cl. ...................................... 126/634; 126/709
(58) Field of Search ............................... 126/634, 674, 126/675, 704, 706, 708, 709

(56) References Cited

U.S. PATENT DOCUMENTS

| | | | | | |
|---|---|---|---|---|---|
| 4,279,243 A | * | 7/1981 | Deakin | ........................ | 126/709 |
| 4,301,789 A | * | 11/1981 | Artweger | ..................... | 126/585 |
| 4,319,559 A | * | 3/1982 | Hermann et al. | ........... | 126/676 |
| 4,345,586 A | * | 8/1982 | Monjes | ........................ | 126/623 |
| 4,392,008 A | * | 7/1983 | Cullis et al. | ................. | 136/248 |
| 4,474,172 A | * | 10/1984 | Burke | ........................ | 126/598 |
| 4,493,940 A | * | 1/1985 | Takaoka | ..................... | 136/248 |
| 4,509,502 A | * | 4/1985 | Youcha | ....................... | 126/699 |
| 4,524,757 A | * | 6/1985 | Buckley | ..................... | 126/624 |
| 4,787,367 A | * | 11/1988 | Crul | ........................... | 126/640 |
| 4,858,594 A | * | 8/1989 | McCurdy | .................... | 126/672 |
| 5,323,763 A | * | 6/1994 | Lechner | ...................... | 126/626 |
| 5,645,044 A | * | 7/1997 | Reiala | ........................ | 126/655 |

* cited by examiner

Primary Examiner—Alfred Basichas
(74) Attorney, Agent, or Firm—Roger A. Marrs

(57) ABSTRACT

A solar-powered fluid heating system, having a thermal collector, a unitary water conducting assembly, and heat retention and efficiency components that are all included in a framework so as to provide a unitary construction. The framework includes a frame structure having non-conductive receptacles for receiving the edge marginal regions of the thermal conductor, so as to be free-floating to allow for thermal expansion and reduction of stresses on components as well as the heat resistant and enhancing components. The arrangement within the frame structure includes a dimpled or waffled metal water conducting assembly that rests upon a layer of insulation material held in the framing structure by a back sheet. The opposite side of the water conducting component is a solar selective sheet having a blackened surface upon which a thermal collector is disposed. The thermal collector includes an array of solar cells, deployed in either serial, parallel or a combination thereof, in an electrical array and which is encapsulated or enclosed by a pair of transparent sheets. A sheet of film is placed on top of the thermal collector, followed by a low glass panel arranged in fixed, spaced-apart relationship with respect to the film sheet. The edge marginal regions of all of the above components are carried in the side and ends of the frame structure and are held in position by spaced-apart, non-conductive receptacles for holding edge marginal regions of the components, and the receptacles are in spaced-apart relationship, so that the components are organized to be held in an augmenting and efficiency enhancing arrangement.

10 Claims, 3 Drawing Sheets

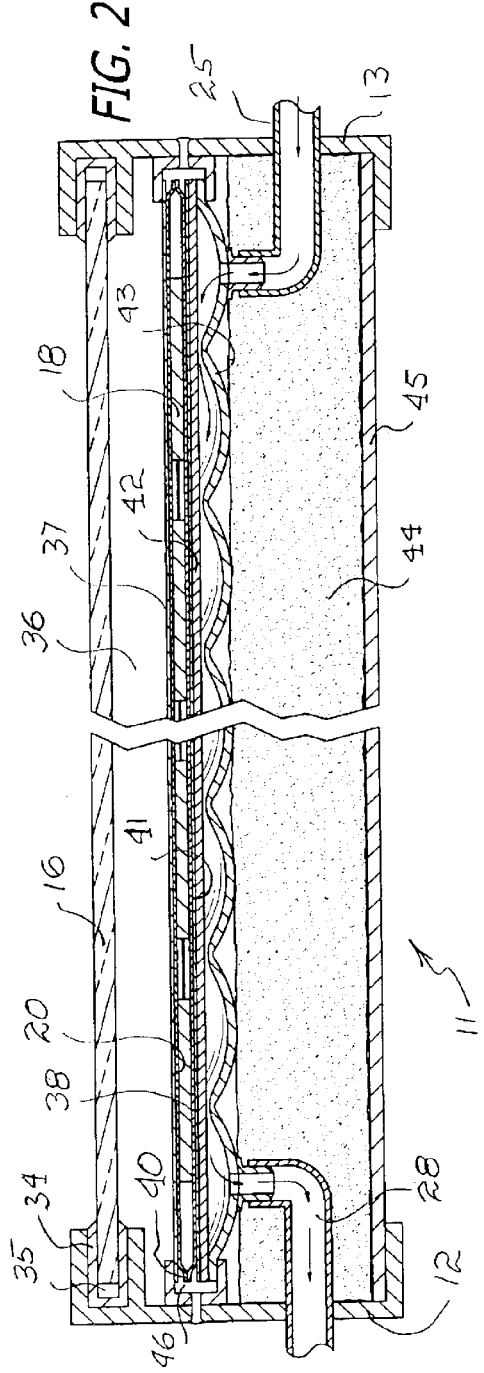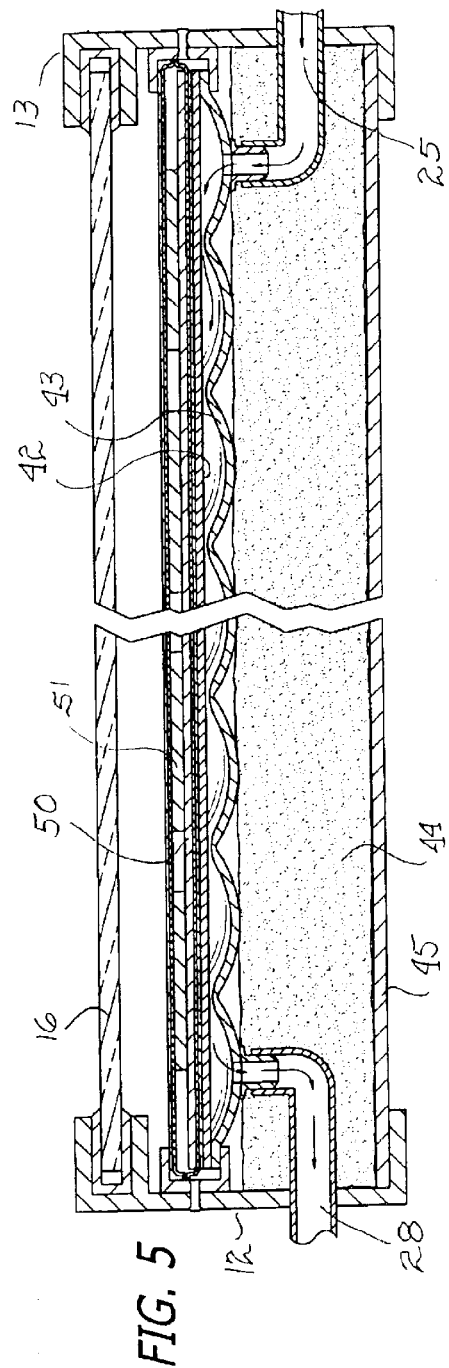

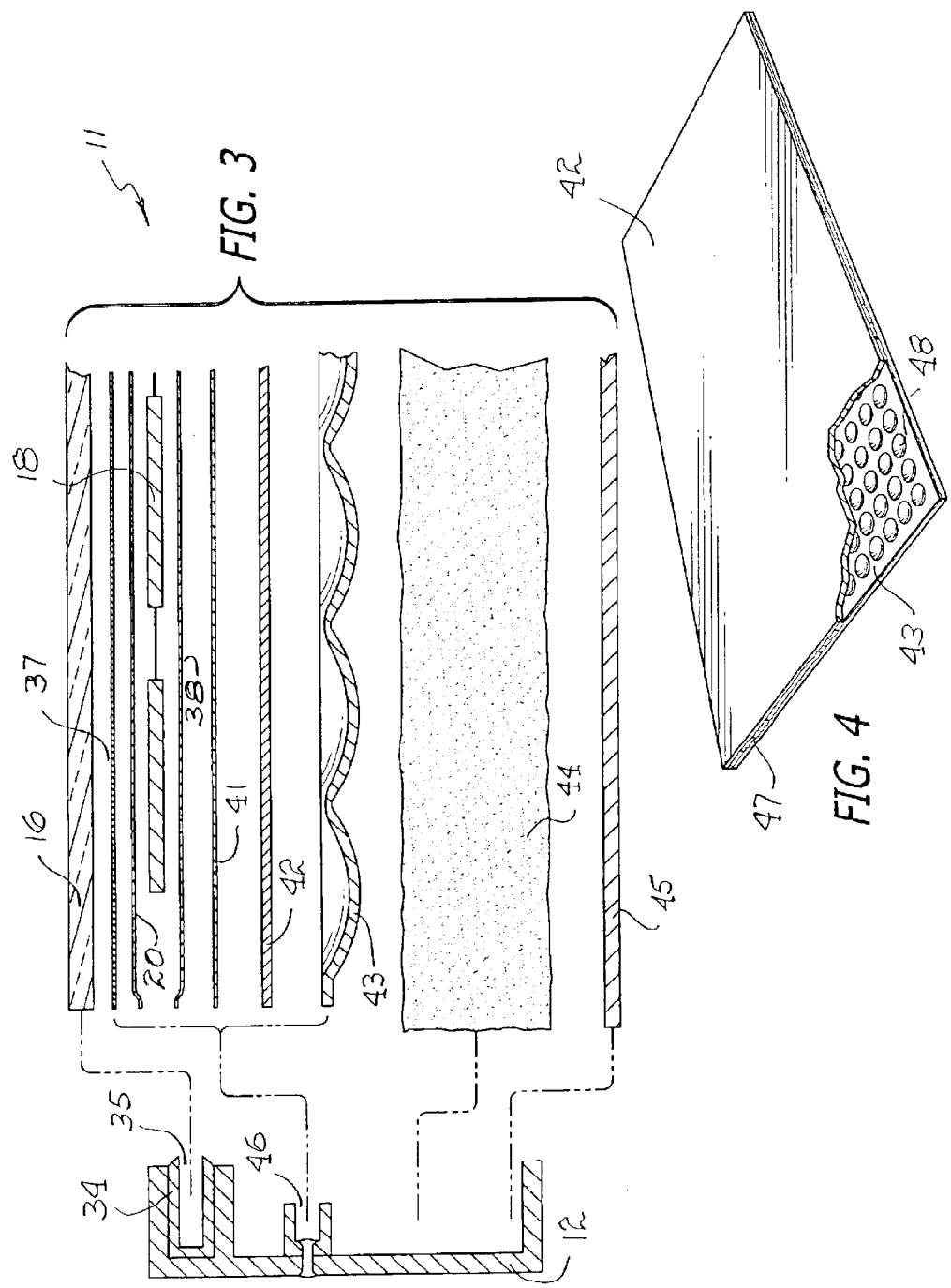

SOLAR ENERGY CONVERSION SYSTEM

This application claims benefit of No. 60/404,550 filed Aug. 21, 2002

BACKGROUND OF THE INVENTION

1. Field of the Invention

The present invention relates to the field of solar-powered fluid heating systems, and more particularly to a novel solar-powered system having a thermal collector assembly which includes a novel fluid conducting structure, and which incorporates thermal conducting means having improved efficiency.

2. Brief Description of the Prior Art

In the past, it has been a conventional practice to employ commercially solar-powered water heating systems, which are self-contained in an unsealed enclosure which surrounds an array of photovoltaic cells for converting solar energy to a heated fluid, such as water or the like. Problems and difficulties have been encountered with such prior assemblies, such as that shown and described in U.S. Pat. No. 5,522,944. The problems and difficulties stem largely from the fact that many of the prior solar-powered water heating systems are unduly complicated, because the systems require an array of separate or independent fluid conducting tubes or pipes. Also, high temperatures and uneven gradients of the collectors cause losses of efficiency in the solar cells and breakdown of the components due to thermal stress. Such an assembly is inefficient since loss of heat in the assembly is experienced so that the efficiency of the assembly is greatly reduced and uneven temperature gradients conflict with the optimal operating parameters of the solar cells.

Therefore, a long-standing need has existed to provide a solar energy system having a solar collector which converts solar radiation into a heated liquid, such as water, by means of a water conduit that insures continuous, precise control of temperature and unrestricted flow through a unitary assembly which includes heat retention and efficiency enhancing components.

SUMMARY OF THE INVENTION

Accordingly, the solar energy system incorporating the present invention includes means providing a solar-powered fluid heating system, having a thermal collector, a unitary water conducting assembly and heat retention and efficiency components which are all included in a framework so as to provide a unitary construction. The framework includes a frame structure having receptacles for receiving the edge marginal regions of the thermal conductor, so as to be free-floating allowing for thermal expansion and reduction of stresses on components as well as the heat resistant and enhancing components. The arrangement within the frame structure includes a dimpled or waffled metal or plastic water conducting assembly that rests upon a layer of insulation material held in the framing structure by a back sheet. The opposite side of the water conducting component is a solar selective sheet having a blackened surface upon which a thermal collector is disposed. The thermal collector includes an array of solar cells deployed in either serial, parallel or a combination thereof, electrical array and which provides environmental protection of the cells and is encapsulated or enclosed by a pair of transparent adhesive sheets. A sheet of protective film is placed on top of the thermal collector, followed by a low iron glass panel arranged in fixed, spaced-apart relationship with respect to the transparent film.

The edge marginal regions of all of the above components are carried in the side and ends of the frame structure and are held in position by spaced-apart thermally non-conductive receptacles that receive the edge marginal regions of the component and the receptacles are in spaced-apart relationship, so that the components are organized to be held in an augmenting and thermal efficiency enhancing arrangement.

Therefore, it is among the primary objects of the present invention to provide a solar energy system for heating a selected fluid employing an array of components which include a two-piece water conducting chamber placed immediately adjacent to a thermal collector.

Another object of the present invention is to provide a solar powered fluid heating system which is arranged in a unitary construction within a frame structure, whereby the components are arranged in a pre-subscribed manner and wherein the water conducting means includes a dimpled sheet of material closed on one side by a sheet whereby fluid conduction occurs between the sheets.

Still a further object of the present invention is to provide a highly efficient water heating system including a thermal collector for obtaining solar energy by which the fluid can be heated, employing a novel fluid conducting assembly.

Still a further object is to provide a water heating system employing a novel thermal collecting and water heating and conducting structure which is arranged in a unitary frame and that may be readily attached to a source of fluid required to be heated.

Another object resides in enhancing the performance of solar cells electrical output by evening out certain "hot spots" associated with fluid solar thermal collection so as to increase efficiency over the total system.

Another object is to provide a fluid heating system enhancing component longevity in the system due to the lowering operating temperatures, therefore experiencing less thermal stress and heat degradation of laminates, adhesives, coatings, seals and the like.

Furthermore, thermal stresses in the innovative system are decreased due to the employment of a "floating" absorber plate or member in the system assembly.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 2 is transverse, cross-sectional view of the assembly shown in FIG. 1, as taken in the direction of arrows 2—2 thereof;

FIG. 3 is a fragmentary sectional view of the structure shown in FIG. 2 illustrated in an exploded condition to clearly illustrate the components in the structure;

FIG. 4 is a front perspective view of the water conduction means used in the structure shown in FIGS. 1–3 inclusive and having a portion broken away to illustrate the dimpled sheet included therein; and FIG. 5 is a view similar to the view of FIG. 2 illustrating another embodiment of the present invention wherein the thermal collector is deposited, sprayed or etched onto a sheet of material. (Selective surface on sheet 42 would be omitted in this process).

DESCRIPTION OF PREFERRED EMBODIMENT

Figure 1:
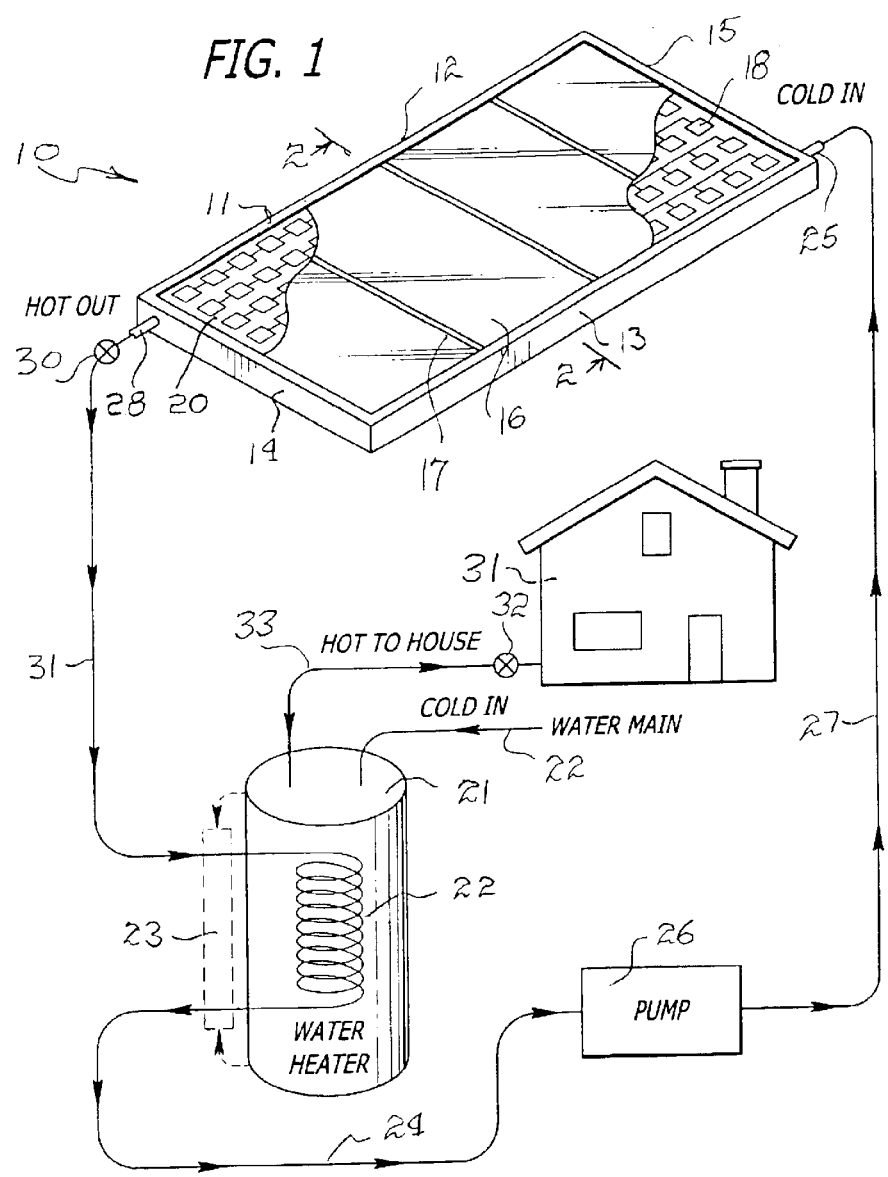
FIG. 1 is a diagrammatic illustration of a fluid heating system employing the solar collector and water conduction means incorporating the present invention.

Referring to FIG. 1, the novel solar-powered heating system is illustrated in the general direction of arrow 10 which includes solar ray collection means and a fluid heating means included in a unitary assembly unit, indicated by numeral 11. The unit includes a framework having opposite sides 12 and 13 connected at their opposite ends to frame ends 14 and is respectively. The assembly 10 illustrates a plurality of glass panels, such as panel 16, arranged side-by-side between the opposite ends 14 and 15 and opposite sides 12 and 13. The adjacent edges of the glass panel 16 may be included in a mounting strip, such as strip 17, which connects the plurality of panels together in a flat arrangement. Immediately under the panels 16, there is provided an array of solar cells, such as cell 18, and it is understood that the cells may be connected in any suitable series, parallel or a combination thereof arrangement. In the embodiment shown in FIG. 1, the plurality of solar cells for collecting solar radiation are arranged in fixed, spaced-apart relationship and are mounted between a pair of encapsulants, as represented by numeral 20 for the top encapsulant.

With respect to the system of operation, it is to be noted that a supply of cold water is introduced into a tank 21 via a conduit 22 connected to a main water supply. The water in the tank 21 is heated either by a coil 22 of piping or through alternate means. Such means may reside in an alternative system. For example, instead of using straight water pressure in the solar collector, a freeze-resistant heat transfer fluid may be circulated through the collector and through an external heat exchanger 23 that will transfer the heat to a domestic hot water storage tank, such as tank 21 or, instead of using street water pressure in the solar collector, a freeze resistant transfer fluid is circulated through the collector and through an internal heat exchanger within the hot water storage tank. In any event, the water from the reservoir or tank 21 is circulated via conduit 24 to an inlet 25 by means of a pump 26 and conduit 27. Inlet 25 conducts the cold water into the unit 11 where the cold water passes through the various components for heating and thermal transfer from the solar cells. The heated water or fluid exits from the outlet 28 and through a valve 30 into a return conduit 31 that delivers the heated water to the coil 22. The heated water is then introduced to a dwelling 31 via a valve 32 and conduit 33.

Referring now in detail to FIG. 2, the assembly of components is illustrated wherein it can be seen that the components are held within the interior of the framework. The glass panels 16 have their edge marginal regions disposed in gaskets, such as gasket 34, and the gaskets are disposed within a receptacle 35. Immediately below the panel 16, there is a wide air space 36 separating the panels from a sheet of transparent film 37. Immediately under the sheet 37, the solar collector is disposed including the plurality of solar cells 18 that are sandwiched between the upper or top sheet 20 and a lower sheet 38 which are joined together at their edges, as illustrated by numeral 40. The sheets 20 and 38 are composed of an encapsulant and abut against the surface of a solar selective layer 41 which is blackened. Next, the sheet 41 rests on a top sheet 42 which is part of the water or fluid conducting means. The other component of the fluid or water conducting means is a dimpled or waffled sheet 43 and the dimpled portion of sheets 43 are secured to the undersurface of the sheet 42 by welding or other suitable securement means. Therefore, sheets 42 and 43 form a single unit or structure and a plurality of inter-connecting openings are defined between their opposing surfaces so as to conduct water or fluid from the inlet pipe 25. The opposite end of the frame includes outlet pipe 28 which is coupled to the sheet 43 and is in fluid communication with the internal water passageway thereof. A layer of thick insulation material 44 supports the water conducting means and a bottom sheet 45 completes the unitary construction. As previously described, the edge marginal region of the fluid conducting means are mounted in a thermally non-conductive receptacle, such as receptacle 46, and are suitably retained therein.

Referring now to FIG. 3, an exploded view of the components is illustrated and it can be seen that the frame 11 suitably mounts and secures all of the components together as an assembly. When taken in connection with FIG. 4, it can be seen that the fluid or water conducting means includes top sheet 42 and the dimpled sheet 43. The opposing surfaces of the two sheets are joined together by cup-like mounds or portions which provide a suitable space between the opposing sheets so that water or fluid is conducted therethrough. Such a cup-like mound is illustrated by numeral 48, while a weld or other means, indicated by numeral 47, joins the edge marginal regions of the two sheets together. It is to be understood that the abutting portions of each mound 48 with the underside of flat sheet 42 may be welded together or need not be joined but merely touching or residing in close proximity. The important factor is that the two sheets be connected together, such as by the weld 47, so that sufficient distribution and circulation of the fluid between the opposing surfaces of the sheets are provided between the inlet 25 and the outlet 28.

Referring to FIG. 5, another version of the unitary construction is provided wherein the solar collector includes a plurality of solar cells that are either deposited, sprayed or etched onto a sheet 50. Such a deposited, sprayed or etched solar cell is indicated by numeral 51. The other components as described above are included and incorporated into this description by reference.

In view of the foregoing, it can be seen that the solar collector and heating unit 11 is a unitary construction having all of the components included within the frame 11. Solar energy such as sun rays are passed through the glass plate 16 and heat the film 37 after passing through the airspace 36. Next, the heat is collected by the plurality of solar cells 18 and the collected heat is then transferred to the combined plates 42 and 43 through which the water or fluid is circulated. The insulation pad 44 maintains the heat within the thermal collector.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A solar energy conversion apparatus comprising:
   a framework;
   a solar collector having an array of spaced-apart solar cells electrically coupled together;
   a fluid conducting means mounted in said framework immediately adjacent said solar collector;
   said fluid conducting means comprising a pair of sheets secured together and having a fluid path residing therebetween; and said fluid path defined between a plurality of mounds provided in a first sheet of said pair of sheets and a second sheet of said pair of sheets engaged with said plurality of mounds.

2. The apparatus defined in claim 1 including:

a fluid input conduit attached to said framework in fluid communication with said fluid path; and a fluid output conduit attached to said framework in fluid communication with said fluid path in spaced-apart relationship with respect to said fluid input conduit.

3. The apparatus defined in claim 2 wherein:

said solar collector and said fluid conducting means are flat and reside immediately adjacent to each other, as a unit, and as a unit have a peripheral edge marginal region; and said framework having a central opening occupied by said unit and further having a receptacle for insertably receiving and retaining said peripheral edge marginal region of said unit.

4. The apparatus defined in claim 3 including:

a blackened layer disposed between said solar collector and said fluid conducting means; and an insulation layer residing against said fluid conducting means.

5. The apparatus defined in claim 4 including:

at least one glass panel mounted on said framework above said solar collector serving as a top panel;

said framework having at least three receptacles for receiving and retaining peripheral edge marginal regions of said glass panel, said solar collector and said insulation respectively.

6. The apparatus defined in claim 5 including:

a transparent film secured to said solar collector in fixed, spaced-apart relationship with respect to said glass panel.

7. A solar powered energy system comprising:

a framework having a pair of opposite side sections joined at their distal ends respectively by a pair of end sections;

a central cavity defined between said side sections and said end sections;

a fluid conducting means mounted on said framework and occupying said central cavity;

a solar collector mounted on said framework in fixed, parallel, spaced-apart relationship;

a blackened layer disposed in said central cavity between said fluid conducting means and said solar collector;

an insulation layer disposed in said central cavity engaging said fluid conducting means on a side of said fluid conducting means opposite to its side in said spaced-apart relationship with said solar collector;

said side sections and said end sections of said framework provided with a plurality of receptacles opening into said central cavity for insertably receiving and retaining said solar collector, said blackened layer, said fluid conducting means and said insulation layer so as to provide a unitary construction;

said fluid conducting means includes a pair of sheets with a first sheet of said pair having a plurality of cup-like mounds arranged in fixed, spaced-apart relationship and a second sheet of said pair of sheets being a flat sheet secured to said first sheet; and said pair of sheets defining a tortuous fluid conductive path between opposing opposite surfaces of said pair of sheets.

8. The system defined in claim 7 including:

an outer glass panel closing said central cavity on a top of said framework and a bottom sheet adjacent said insulation layer on a bottom of said framework.

9. The system defined in claim 8 including:

an encapsulant enclosing said solar collector.

10. The system defined in claim 9 including:

a transparent film carried on said solar collector facing said top panel.

* * * * *